United States Patent [19]

Benhamida et al.

[11] Patent Number: 5,619,681
[45] Date of Patent: Apr. 8, 1997

[54] DELAYED FIFO STATUS FOR SERIAL SHIFT EMULATION

[75] Inventors: Boubekeur Benhamida, Boise; Grant Richards, Meridian, both of Id.; Stephen H. Chan, Sunnyvale, Calif.; Gyle Yearsley, Boise, Id.; Jim Nobugaki, Asao-ku, Japan

[73] Assignee: Zilog, Inc., Campbell, Calif.

[21] Appl. No.: 85,030

[22] Filed: Jun. 30, 1993

Related U.S. Application Data

[63] Continuation-in-part of Ser. No. 980,372, Nov. 23, 1992, abandoned.

[51] Int. Cl.[6] .............................. G06F 9/455; G06F 13/00
[52] U.S. Cl. .................. 395/500; 364/232.3; 364/238.5; 364/239; 364/239.6; 364/DIG. 1
[58] Field of Search ..................................... 395/325, 500

[56] References Cited

U.S. PATENT DOCUMENTS

| | | |
|---|---|---|
| 3,851,335 | 11/1974 | Elliott . |
| 4,425,664 | 1/1984 | Sherman et al. . |
| 4,441,154 | 4/1984 | McDonough et al. . |
| 4,525,804 | 6/1985 | Mosier et al. . |
| 4,641,263 | 2/1987 | Perlman et al. ........................ 395/500 |
| 4,651,316 | 3/1987 | Kocan et al. . |
| 4,700,358 | 10/1987 | Duncanson et al. ..................... 371/111 |
| 4,785,416 | 11/1988 | Stringer . |
| 4,930,069 | 5/1990 | Batra et al. . |
| 5,062,059 | 10/1991 | Youngblood et al. ................... 395/275 |
| 5,075,874 | 12/1991 | Steeves ................................... 395/112 |
| 5,168,356 | 12/1992 | Acampora et al. . |
| 5,181,201 | 1/1993 | Schauss et al. . |
| 5,297,246 | 3/1994 | Horiuchi et al. ......................... 395/150 |
| 5,303,349 | 4/1994 | Warriner et al. ......................... 395/275 |

OTHER PUBLICATIONS

Microcom Reference Manual, "Parallel Port Operation" p. 27, 1993.

*Primary Examiner*—Kevin J. Teska
*Assistant Examiner*—Ayni Mohamed
*Attorney, Agent, or Firm*—Majestic, Parsons, Siebert & Hsue

[57] ABSTRACT

Delay circuitry is used in a circuit to delay the transmission of groups of data until another circuit expects these groups of data. In one embodiment, emulating circuitry is used to emulate the timing of transmitter and receiver UART FIFOs. This emulating circuitry uses delays equal to the amount of time the UART FIFOs take to serially shift out data in the transmitter UART FIFO, and to serially shift in data in the receiver UART FIFO. This allows the modem chip to use a parallel-to-parallel FIFO buffer for the transmitter FIFO buffer and the receiver FIFO buffer.

15 Claims, 6 Drawing Sheets

DELAYED FIFO STATUS FOR SERIAL SHIFT EMULATION

CROSS REFERENCE TO RELATED APPLICATIONS

This is a continuation-in-part to U.S. Application Ser. No. 07/980,372, entitled "Delayed FIFO Status for Serial Shift Emulation", filed on Nov. 23, 1992 now abandoned.

BACKGROUND OF THE INVENTION

This invention relates to the transfer of data, such as the transfer of data between a modem controller chip and a personal computer.

Generally, modem chips use serial shift first-in first-out buffers, or serial shift FIFOs. Serial shift FIFOs have data written in or read out serially using a serial register. The 16550 chip produced by National from Santa Clara, Calif. is an universal asynchronous receiver transmitter or UART which uses serial shift FIFOs to buffer a serial-to-parallel interface. In the transmitter UART FIFO, data is written to the UART FIFO in parallel from a personal computer or PC and sent out of the UART FIFO serially. In the receiver UART FIFO, data is written in to the UART FIFO serially and read out to the PC in parallel.

SUMMARY OF THE INVENTION

The present invention involves sending data between two circuits with a delay so that data is sent at time intervals when the circuit to be sent the data expects the data. In some situations, a first circuit will be expecting a second circuit to send it groups of data at certain time intervals. The present invention involves using delay circuitry in the second circuit so that the groups of data are sent to the first circuit at intervals when this first circuit expects this data.

The two circuits may be a master processor and a slave processor. Alternatively, the two circuits may be co-processors.

In a preferred embodiment, the second circuit is a modem controller chip and the first circuit is a personal computer. Modem controller chips typically contain UARTs which use serial shift FIFOs to buffer a serial-to-parallel interface. When data is being sent from the modem controller chip to the personal computer, the software of the personal computer expects groups of data from the modem controller chip at certain time intervals. Errors may occur if the groups of data are sent at shorter time intervals. These errors may occur because the personal computer's software needs to control other tasks; these other tasks may fail if they are ignored in order to accept groups of data from the modem controller chip at shorter time intervals.

It is desired to replace the serial shift transmitter UART FIFO and the serial shift receiver UART FIFO with parallel-input, parallel-output transmitter and receiver FIFOs. Since parallel-input, parallel-output receiver FIFOs can be filled with data faster than the UART serial shift FIFOs, sending the data to the PC as soon as the parallel-input parallel-output FIFO is full may cause problems for the PC's software. Additionally, the parallel-input, parallel-output transmitter FIFOs can be emptied of data faster than the UART serial shift FIFOs which also may cause problems for the PC's software.

A preferred embodiment of the invention concerns the emulation of the status bits that indicate the status of the transmitter and receiver UART FIFOs. For the parallel input, parallel output receiver FIFO, a character count indication of the amount of data stored in the FIFO is sent to the emulating circuitry for the receiver FIFO. Each time the MPU on the modem controller chip sends a write signal to write to the receiver FIFO, the write signal updates a delay counter in the emulating circuitry. This delay counter produces a delay count which is subtracted from the character count in a arithmetic logic unit or ALU which is part of the emulating circuitry, to produce a delayed character count. The delay counter is decremented by a character counter that decrements the delay counter after a predetermined period of time equal to the amount of time that it takes for a character to be shifted into the serial shift receiver UART FIFO. This character timer is loaded with the value of a register and decremented with a clock signal. The delayed character count is used to produce delayed status bits which are seen by the PC. These delayed status bits emulate the status bits that the PC expects from the serial shift receiver UART FIFO buffer. The PC will respond to the status bits of the modem chip as if the modem control chip contained the serial shift receiver UART FIFO buffer that the PC expects the modem chip to contain. In this manner, the groups of data are sent from the modem controller chips to the PC at the time intervals that the PC expects these groups of data.

Another embodiment of the present invention relates to the situation in which a first circuit sends data to a buffer in a second circuit. The first circuit may expect to be given notification from the second circuit that the buffer is available to accept data at a certain interval. This interval may corresponds to the period of time that the first circuit expects the buffer in the second circuit to empty of data after being filled by the first circuit. If the second circuit sends this notification to the first circuit at a shorter interval than the first circuit expects the notification, the first circuit may service the buffer in the first circuit too often. Delay circuitry in the second circuit can delay the sending of the notification to the first circuit until the first circuitry expects the notification.

In a preferred embodiment, the second circuit is a modem controller chip and the first circuit is a personal computer. As stated above, modem controller chips typically contain UARTs which use serial shift FIFOs to buffer a serial-to-parallel interface. When data is being passed from the personal computer to the modem controller chip, the data fills a buffer in the modem controller chip. The modem controller chip sends a notification to the personal computer when the buffer is available to accept more data. The software of the personal computer expects the buffer in the modem controller chip to empty at a certain rate as the data is sent out off the modem chip. In other words, the software of the personal computer expects to be sent notification that the buffer is available at a certain time intervals. The personal computer may automatically fill the buffer as soon as the personal computer is sent the notification. If the software of the personal computer is sent the notification from the buffer at shorter intervals than it expects, it may spend more time servicing the buffer than is desirable. Errors may occur because the personal computer's software needs to control other tasks; these other tasks may fail if they are ignored in order to pass data to the buffer of the modem controller chip at shorter time intervals. For example, the use of a parallel input, parallel output transmitter FIFO rather than a UART serial shift FIFO in the modem controller chip may cause the personal computer to service the buffer at shorter intervals than desired. Delay circuitry in the modem controller chip can delay the sending of the notification to the personal computer until the personal computer expects this notification. In the above example, the notification is delayed until a UART serial shift FIFO would send the notification.

Additionally, the present invention includes the use of emulating circuitry to emulate the timing of the serial shift transmitter UART FIFO. Instead of a serial shift transmitter UART FIFO, a parallel input, parallel output transmitter FIFO is used. Data is written from the PC to the transmitter FIFO in parallel and data is read out in parallel by the MPU on the modem chip. The emulating circuitry sends out a delayed transmitter buffer empty signal. A delay counter is incremented when the read signal from the MPU on the modem chip is sent indicating that a character of the transmitter FIFO is being read by the MPU. This delay counter is decremented by a character timer which emulates the amount of time that a UART transmitter FIFO would take to serially shift out data. The character timer is loaded with the value of a register and decremented with a clock. When the character timer reaches zero, the delay counter is decremented. When the delay counter becomes zero, the delayed transmitter buffer empty signal is sent.

Furthermore, the present invention involves methods of emulating the transmitter and receiver UART FIFOs.

BRIEF DESCRIPTION OF THE DRAWINGS

The above and other features and aspects of the present invention will become more apparent upon the reading of the following detailed description in conjunction with the accompanying drawings, in which:

In FIGS. 1 and 2, structures that are the same are labelled with the same number.

DETAILED DESCRIPTION OF THE PREFERRED EMBODIMENT

Figure 4:
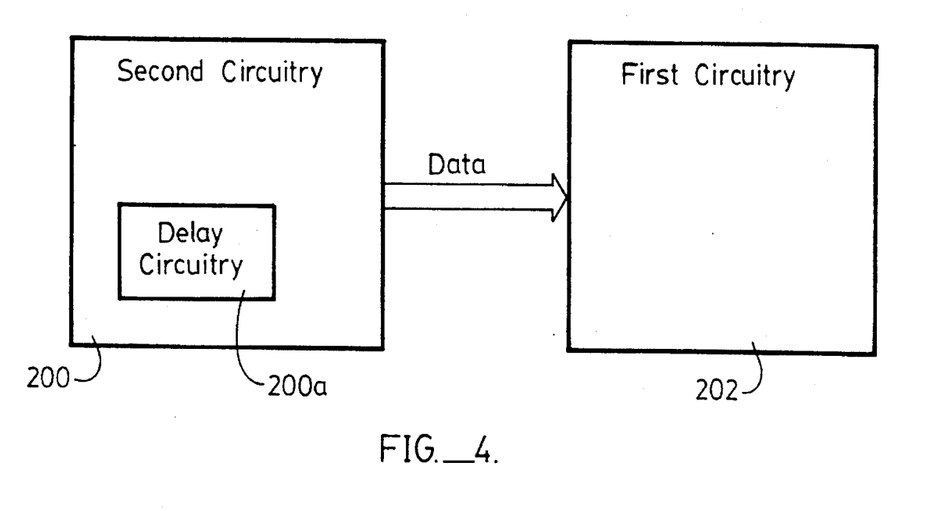
FIG. 4 is a block diagram showing the circuitry of the present invention.

FIG. 4 is a block diagram showing a first circuitry 202 and a second circuitry 200 of the present invention. The first circuitry 202 expects the groups of data from the second circuitry 200 at certain time intervals. For example, the first circuitry 202 may use software that was designed with the assumption that the second circuitry 200 will interrupt the first circuitry at these certain time intervals. If the software is interrupted at shorter intervals, the software might ignore other tasks it must do. It may cause no problems that the software is interrupted at shorter intervals if the software of the first circuitry is robustly designed. However, there is a possibility that the operation of the first circuitry 202 may be damaged by too many interruptions in short interval.

Delay circuitry 200a in the second circuitry 200 can ensure that the groups of data is sent to the first circuitry 202 at time intervals that the first circuitry 202 expects the group of data.

The second circuitry 200 may be master microprocessor and the first circuitry 202 may be a slave microprocessor. Alternatively, the first circuitry 202 and second circuitry 200 may be co-processors.

In a preferred embodiment, the second circuitry 200 is a modem controller chip and the first circuitry 202 is a personal computer. Modem controller chips typically contain UARTs which use serial shift FIFOs to buffer a serial-to-parallel interface. As described below, if the UART serial shift FIFO is replaced by a parallel input parallel output FIFO, the FIFO will be filled with data quicker. Assuming that the software of the personal computer will automatically cause the modem controller chip to send a group of data to the personal computer when the PC is given a "FIFO buffer full" indication, using a parallel input parallel output FIFO could cause the personal computer to concentrate on servicing the modem controller chip and to ignore other tasks if no delay circuitry is used. Since the software of the personal computer is expecting the groups of data from the modem controller chip at certain intervals, errors may occur if the groups of data are sent more often.

Figure 5:
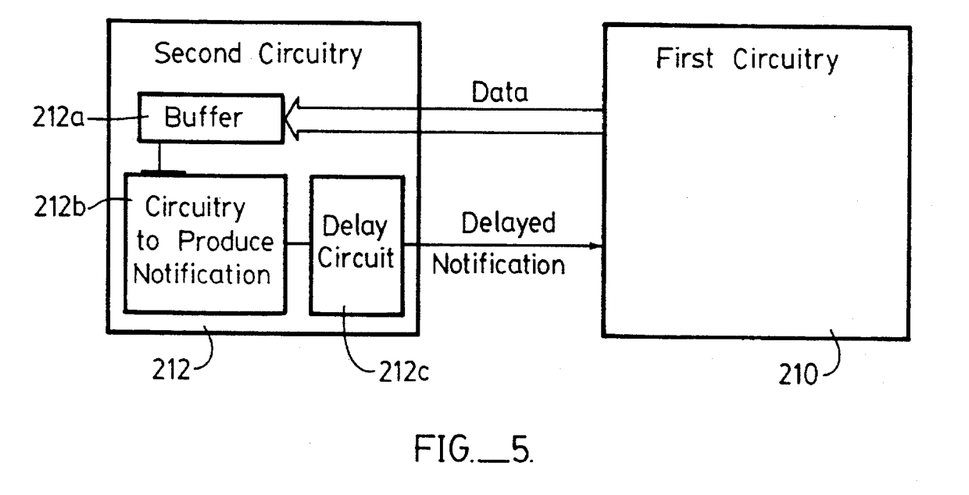
FIG. 5 is a block diagram showing another embodiment the present invention.

FIG. 5 is a block diagram showing another embodiment the present invention. The first circuitry 210 passes data to a buffer 212a in a second circuitry 212. The second circuitry 212 also includes circuitry 212b to produce a notification to the first circuitry 210 that the buffer 212a is available to be sent data and includes delay circuitry 212c to delay the sending of this notification to the first circuitry 210. The first circuitry 210 may expect to be sent notification from the second circuit that the buffer 212a is available to accept data at a certain period after the buffer 212a is filled. This period may correspond to the interval of time that the first circuitry 210 expects the buffer 212a in the second circuit 212 to empty of data. Delay circuitry 212c in the second circuitry 212 can delay the sending of the notification to the first circuitry until the first circuitry 210 expects the notification.

In a preferred embodiment, the second circuit 212 is a modem controller chip and the first circuit 210 is a personal computer. Data being passed from the personal computer to the modem controller chip fills a buffer 212a in the modem controller chip. The modem controller chip sends a notification to the personal computer when the buffer is available to be given more data. The software of the personal computer expects the buffer in the modem controller chip to empty at a certain rate as the data is sent out off the modem chip. For example, the software of the personal computer may expect the buffer 212a to empty at the rate of a serial shift UART FIFO. Assuming the buffer 212a is a parallel input, parallel output FIFO buffer, the buffer 212a would empty quicker than the personal computer expects. The software of the personal computer may automatically send data to the buffer 212a when the personal computer is sent the notification that the buffer 212a is empty. If the time between notifications is made shorter by using a faster buffer 212a, the personal computer may spend more time servicing the buffer 212a than is desirable. Errors may occur because the personal computer's software needs to control other tasks; these other tasks may fail if they are ignored in order to pass groups of data to the buffer 212a of the modem controller chip at a higher rate. Delay circuitry 212c in the modem controller chip can delay the sending of the notification to the personal computer. For example, the notification can be delayed until a UART FIFO would send the notification.

Figure 6:
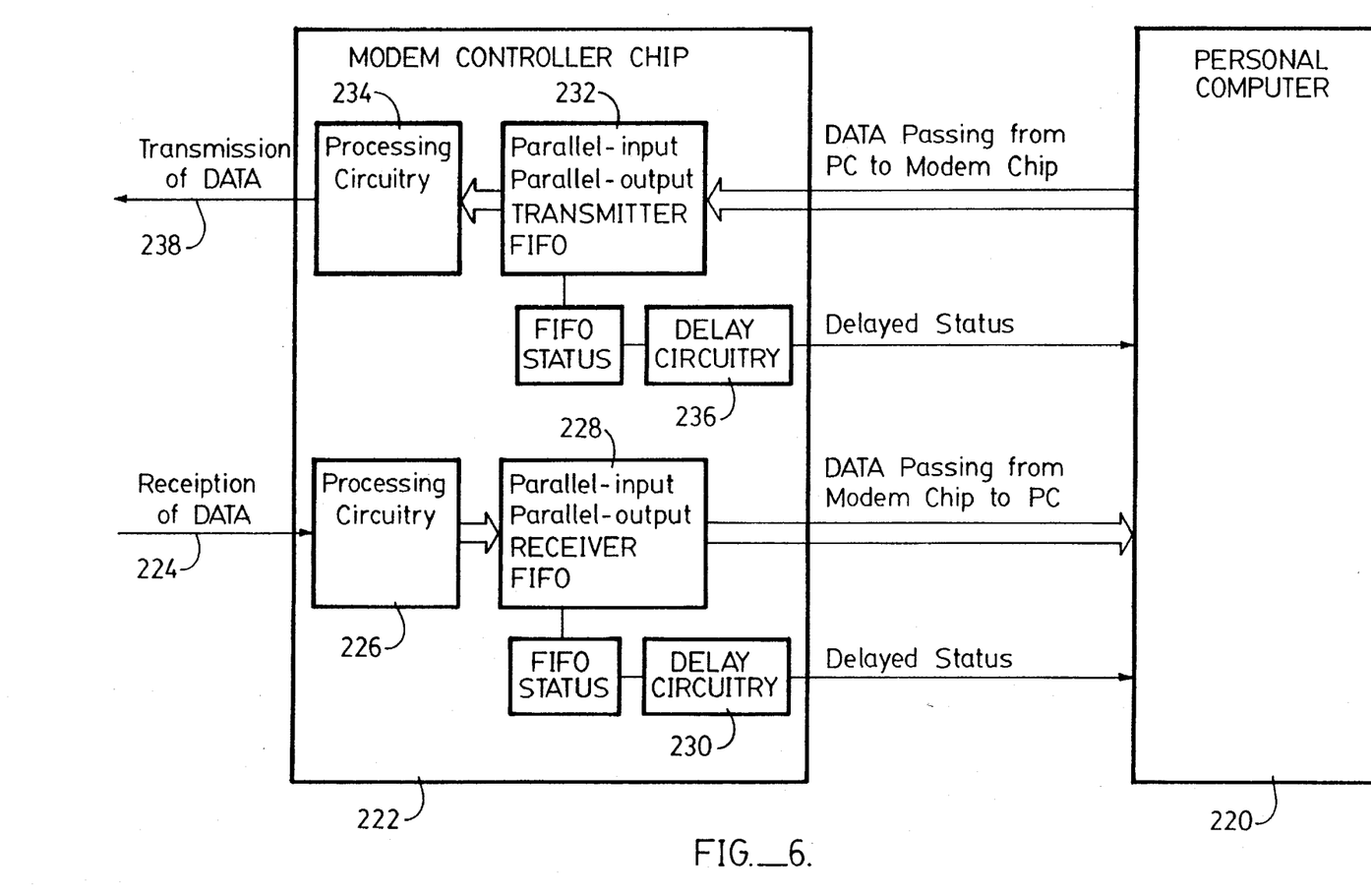
FIG. 6 is a block diagram showing an yet another embodiment of the present invention showing a personal computer and a modem controller chip.

FIG. 6 is a block diagram showing an yet another embodiment of the present invention showing a personal computer 220 and a modem controller chip 222. This figure shows workings of the different data paths. Data on line 224 is received by the modem controller chip 222 and then sent to processing circuitry 226. Processing circuitry 226 translates the data from serial to parallel and may perform decompression on the data. The data is then sent to a parallel-input, parallel-output receiver FIFO 228. This FIFO is called a receiver FIFO because the data in this FIFO is comes from outside line 224. The parallel-input, parallel-output receiver FIFO 228 takes the place of a serial shift FIFO that the personal computer 220 expects the data to passed from. Delay circuitry 230 delays the sending of notification to the personal computer of the status of FIFO 228. This delay may be implemented by sending a delayed character count that emulates the character count that the serial shift FIFO would have. The data is passed from the modem controller chip 222 to the personal computer 220.

Additionally, data is sent from the personal computer 220 to the parallel-input parallel output transmitter FIFO 232. This FIFO 232 is called a transmitter FIFO because it holds the data to be sent out of line 238. This FIFO 232 replaces the serial shift FIFO that the personal computer 220 assumes is it is passing the data to. The Data is sent from the FIFO 232 to the processing circuitry 234. Since data can be shifted out of the FIFO 232 quicker than the personal computer 220 expects. Delay circuitry 236 delays a notification to the personal computer 220 that the FIFO 232 is available. Processing circuitry 234 converts the data from parallel to serial and may compress the data. The data is then sent out of line 238.

Figure 1:
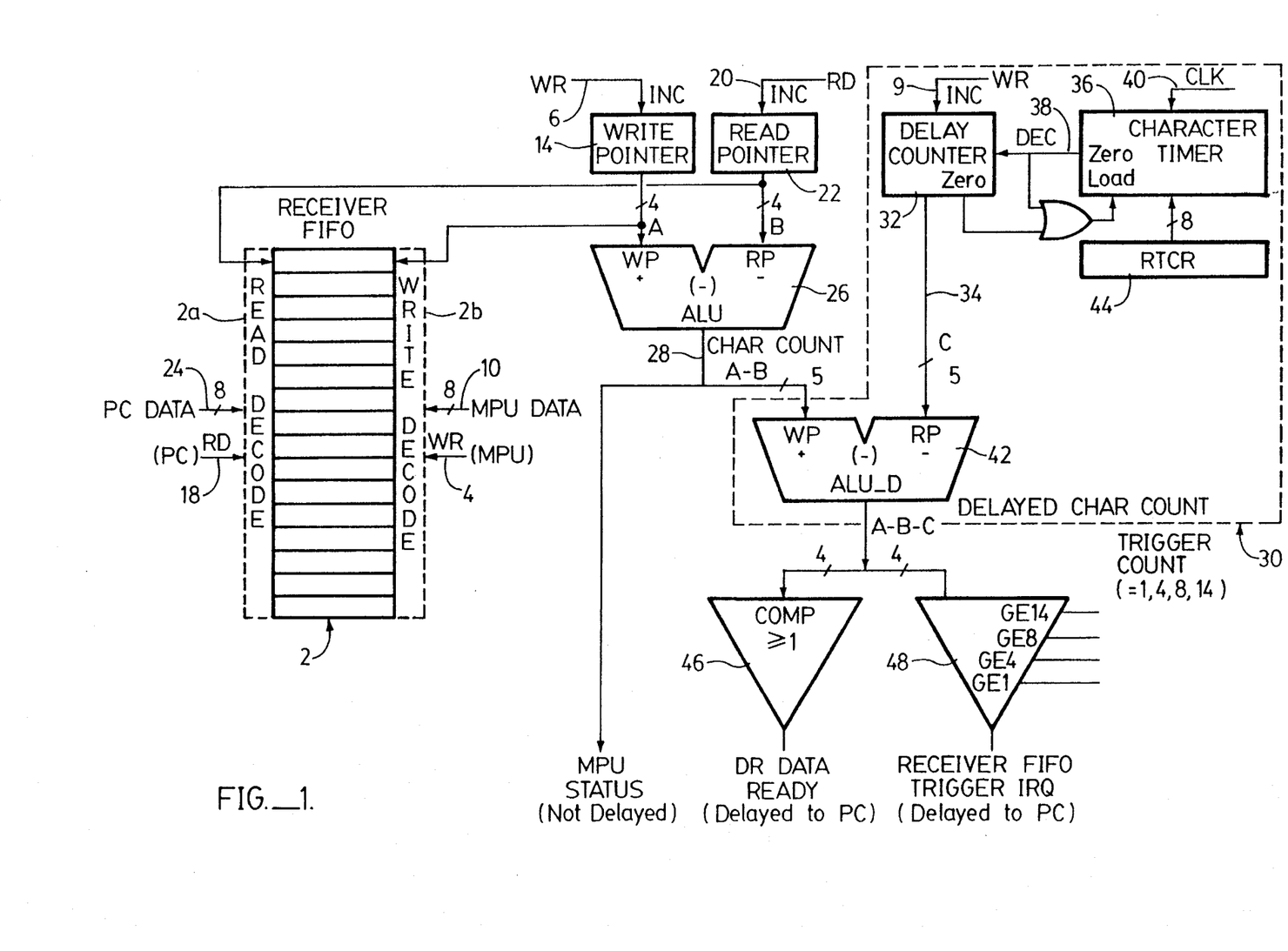
FIG. 1 is a schematic showing the parallel input, parallel output receiver FIFO and the emulating circuitry for emulating the timing of a receiver UART FIFO.
Figure 2A:
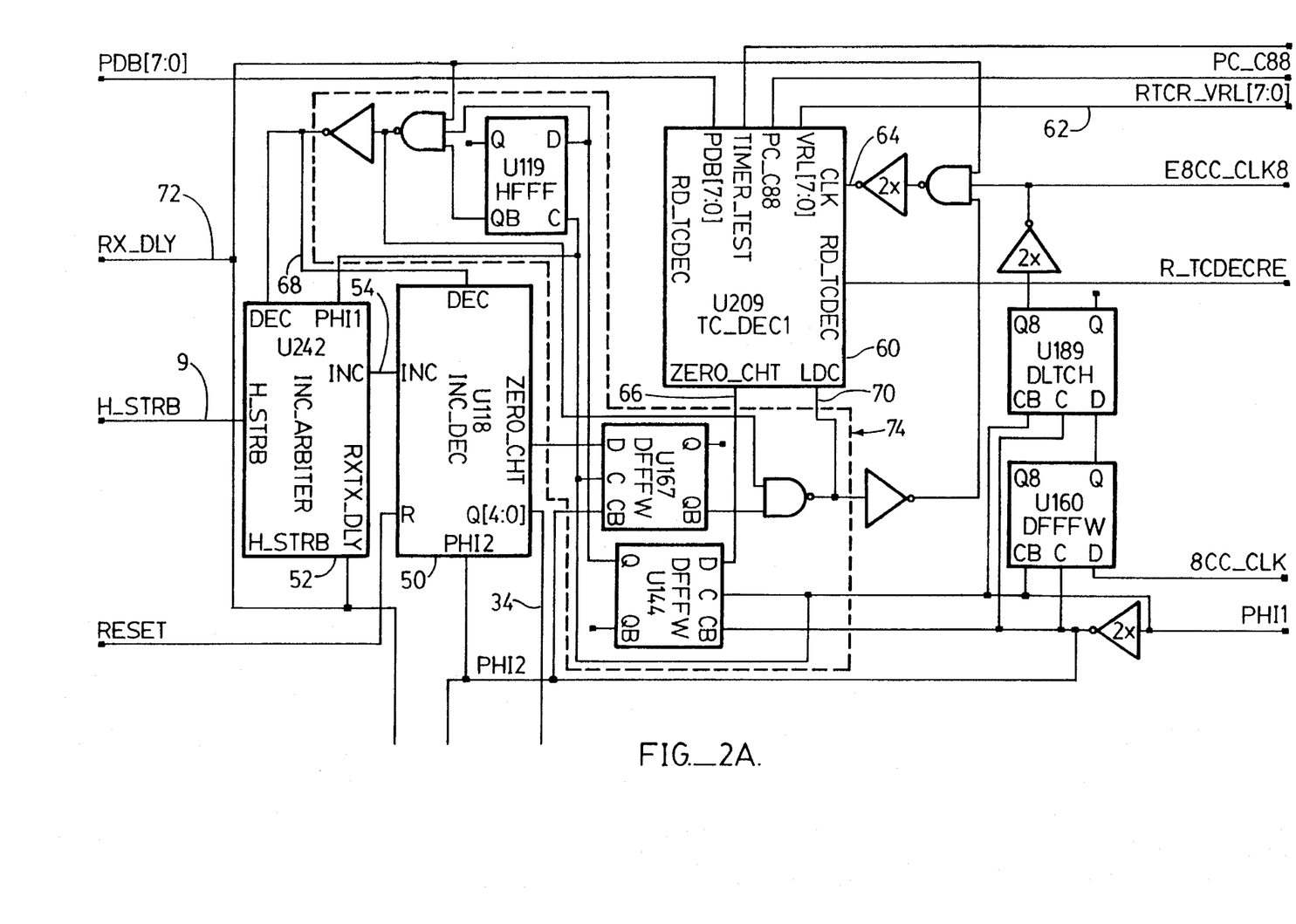
FIG. 2 is another schematic showing the emulating circuitry of the present invention.
Figure 2B:
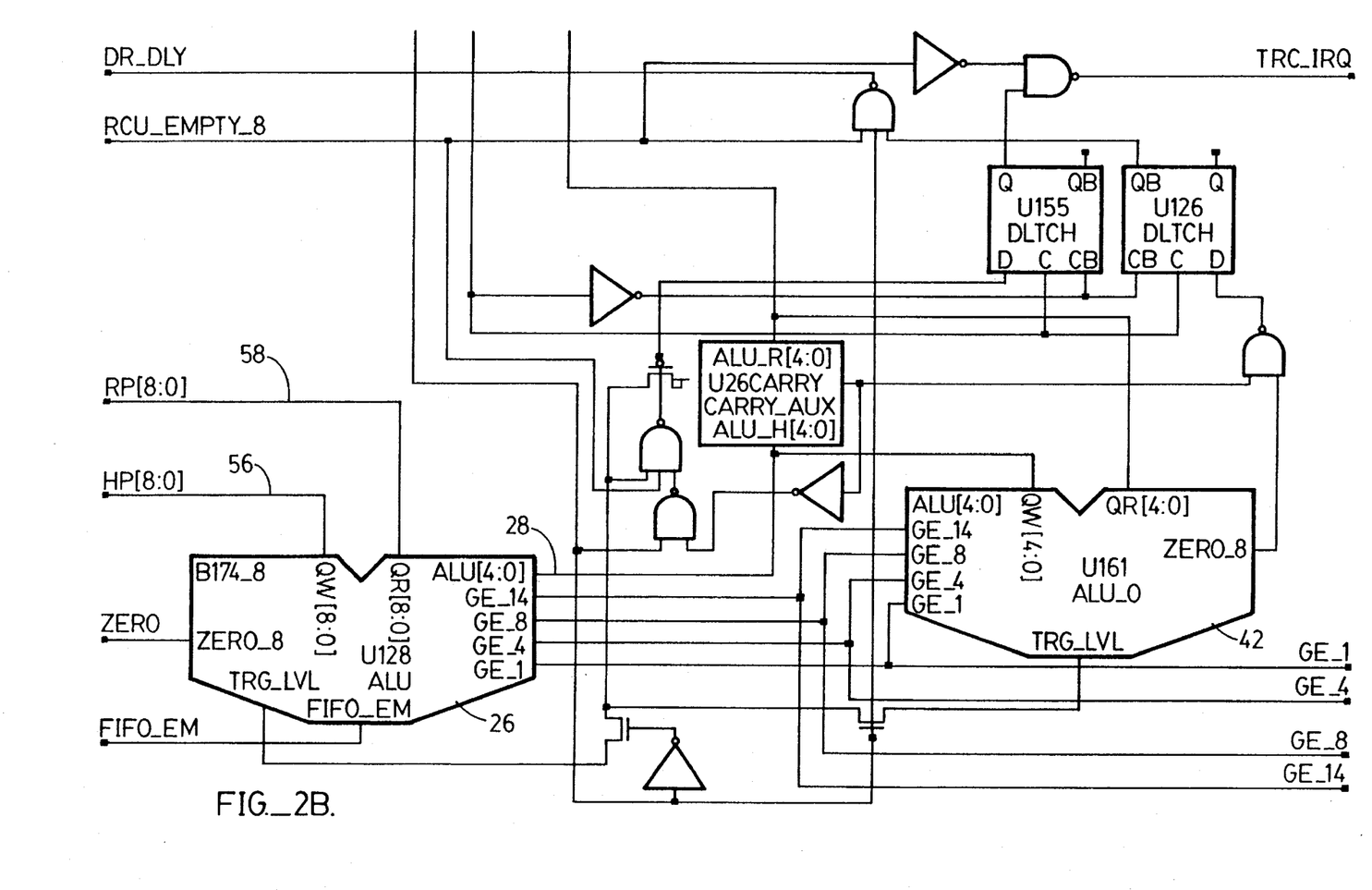
Figure 3:
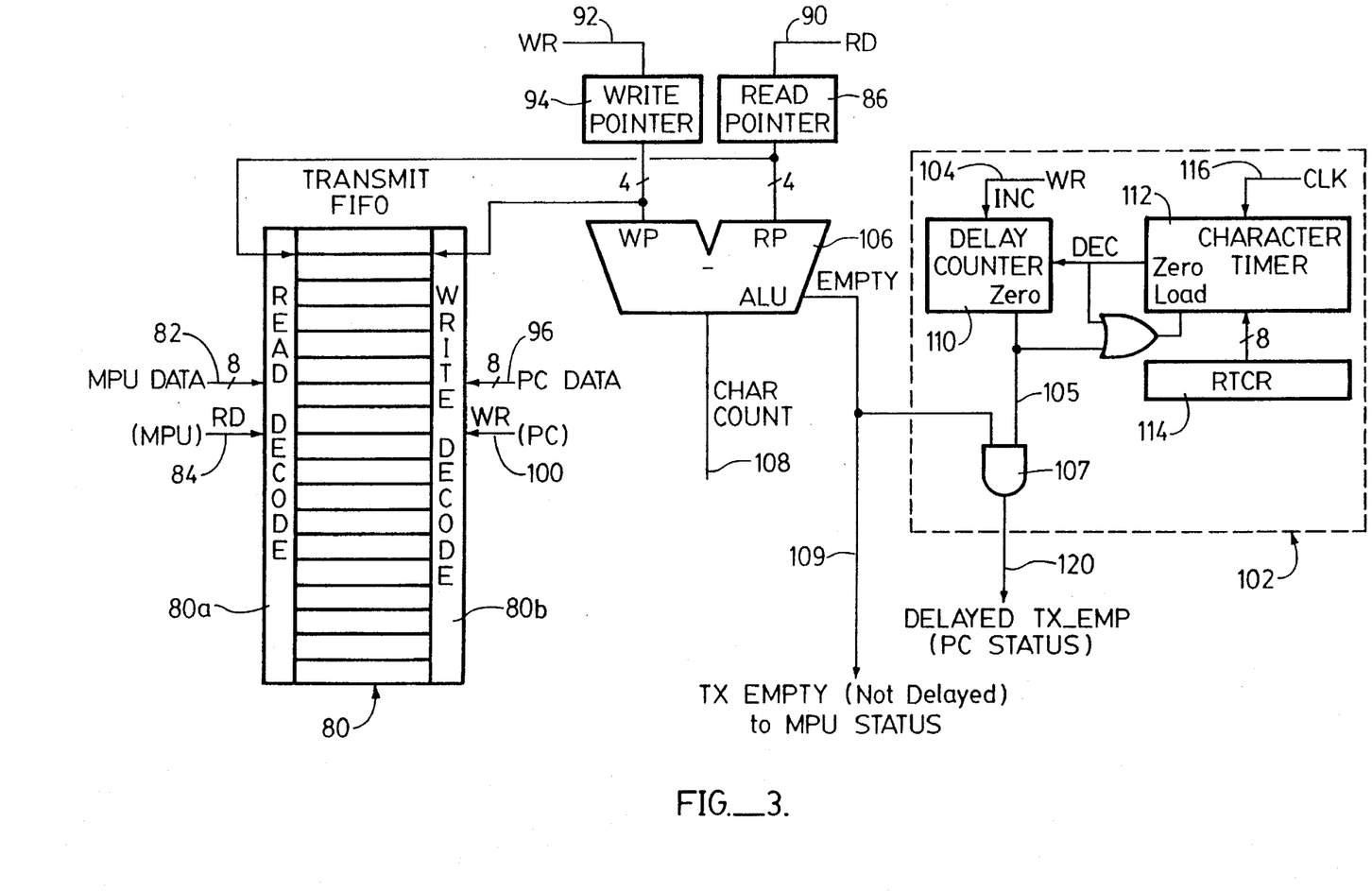
FIG. 3 is a schematic showing the parallel input, parallel output transmitter FIFO and the emulating circuitry for emulating the timing of a transmitter UART FIFO.

The circuitry of FIG. 6 is shown in more detail in FIGS. 1–3. FIG. 1 is a schematic showing receiver FIFO 2 and emulating circuitry 30 which emulates the status bits that would be sent by a serial shift receiver UART FIFO (not shown). The receiver FIFO 2 is a parallel input, parallel output FIFO buffer. The present invention can be used on a modem chip that has a dedicated high speed serial controller (not shown) that converts the serial modem input data to parallel input data and sends this parallel data to a microprocessor unit or MPU (not shown) which does data compression. Replacing a receiver UART FIFO with a parallel input, parallel output FIFO buffer 2 can allow the MPU on the modem chip to fill up the buffer 2 more efficiently. A parallel input, parallel output FIFO allows for the transfer of data at very high rates which is beneficial for direct memory access and other uses. The emulation circuitry 30 gives the chip the flexibility to emulate the speed of the original 16550 UART.

The receiver FIFO 2 is written to by the MPU. The MPU produces the write signal which is sent to the receiver FIFO 2 on line 4, to the write pointer generating circuitry 14 on line 6, and to the delay counter 32 of the emulating circuitry 30 on line 9. Additionally, the MPU sends data in parallel on a data line 10 to the receiver FIFO. A write decode section 2b of the receiver FIFO 2 uses the data on the MPU data line 10, the write signal on the write signal line 4, and the write pointer from the write pointer generating circuitry 14 to determine when and where to write to the receiver FIFO 2.

The write pointer generating circuitry 14 is incremented by the write signals over line 6 from the MPU. The read signals are generated by a personal computer or PC (not shown) and are sent to the read decode section 2a of the receiver FIFO 2 over line 18 from the PC. The read signal is also sent over line 20 to the read pointer circuitry 22. The read pointer generating circuitry 22 is updated by the read signals from the PC over line 20 to produce a read pointer which is sent to the read decode section 2a of the receiver FIFO 2. The data being read by the PC is sent in parallel over lines 24 from the receiver FIFO 2 to the PC. The receiver FIFO 2 uses the write pointer and write signal to determine where and when data from the MPU is written into the receiver FIFO 2. The receiver FIFO 2 uses the read pointer and read signal to determine when and where the data is read from the receiver FIFO 2. The difference between the write pointer and the read pointer is determined by a first arithmetic logic unit or ALU 26. This produces the character count on line 28. The character count is an indication of the non-delayed status of the receiver FIFO. If the FIFO 2 has 16 character locations, the write pointer and read pointer can be expressed with four bits but the character count on line 28 requires five bits so that the buffer full condition (character count equals 16 or 10000 in binary) can be expressed.

A problem with merely replacing a receiver UART FIFO with a receiver FIFO 2 which receives data in parallel and sends out data in parallel is that the receiver FIFO 2 can be updated by the MPU much quicker than the UART FIFO could be, since data can be written to the receiver FIFO 2 in parallel, while the UART FIFO uses a serial shift register to serially shift in data from serial to parallel. The PC's software which is accustomed to the delays caused by the serial shifting in of data would, since the MPU can write to the receiver FIFO 2 quicker than data could be written to the receiver UART FIFO, want to read data from the buffer much more often with the receiver FIFO 2 than with a receiver UART FIFO. The software on the PC may not be capable of servicing the FIFO at a rate more rapid than the maximum serial data rate of the original UART FIFO.

To overcome this problem, the emulating circuitry 30 is used to emulate the timing of receiver UART FIFO. The emulating circuitry 30 emulates the status bits that would be produced by a serial shift UART FIFO. The emulating circuitry 30 does this by producing delayed status bits that are a delayed indication of the status of the receiver FIFO 2.

When the receiver FIFO is written to by the MPU, the delay counter 32 is incremented. The delay counter 32 produces a delay count C over line 34. The delay count in the delay counter 32 is decremented by a character timer 36. When the character timer 36 reaches zero, a decrement signal is sent over line 38 to delay counter 32. This character timer 36 is loaded with the value which is within a time constant register 44, when the delay counter is decremented or when the delay counter counts down to zero. The value within the time constant register 44 is set so that the character timer 36 takes a predetermined amount of time to count down to zero, and thus decrement the delay counter 32. The character timer 36 is decremented from the value in the time constant register 44 down to zero by clocked pulses over line 40. The value of the time constant register 44 is determined considering the clock frequency on line 40, so that the character timer 36 counts down to zero in the amount of time that a receiver UART FIFO would take to serially shift in the written data. The value in the time constant register 44 would normally be chosen to be one character assembly time. A character assembly time is equal to the bit time multiplied by the number of bits per character. The delay count C on line 34 and the character count on line 28 are sent to the second ALU 42 to produce a delayed character count. This delayed character count is checked to see if it is greater than or equal to one in order to set the delayed data ready bit, and is checked if it is greater than or equal to the trigger count to set a delayed FIFO trigger bit.

Since the MPU writes to the receiver FIFO 2 much quicker than the PC can read from the receiver FIFO 2, the delayed character count delays the indication of the buffer status. Assuming that, in a preferred embodiment, the receiver FIFO 2 has sixteen characters of buffer space, and the MPU writes into the receiver FIFO in bursts of sixteen characters, immediately after the sixteen writes to the receiver FIFO 2, the write pointer circuitry 14 is incremented sixteen times such that the character count from the ALU 26 is equal to sixteen. Additionally, the delay counter 32 in the emulating circuit 30 is incremented sixteen times. The output of the second ALU 42 would then be the character count minus the delay count, or zero; the delayed data ready bit from the comparator 46 would be zero; and, the delayed receiver FIFO trigger bit from the delayed trigger count comparator 48 would be zero. The value in time constant register 44 is loaded into the character timer 36, and then the character timer 36 is decremented by the clock. After the predetermined amount of time, the delay counter 32 is decremented, and thus the delay count on line 34 is now equal to fifteen, and the output of the second ALU 42 or the delayed character count is now equal to one. The delayed data ready line will be set as the character timer 36 continues to decrement the delay counter 32, the value of the delayed character count will rise so that eventually when the delayed character count is greater than the trigger count, the delayed trigger count comparator 48 will set a receiver FIFO trigger bit. This delayed trigger count comparator 48 can be set at a trigger count of one, four, eight, or fourteen. The receiver FIFO trigger bit can be polled by the PC, can set up an interrupt request for the PC, or can be used to implement the direct memory access. When the PC reads from the receiver FIFO, the read pointer is incremented; therefore, the character count on line 28 is reduced and the delayed character count from the second ALU 42 is also reduced. If the character count was not delayed, and the character count from the ALU 26 was used to form a data ready bit and the receiver FIFO trigger bit, the data ready bit and the receiver FIFO trigger bit would be set almost immediately after the MPU fills the receiver FIFO 2 with the burst of sixteen characters. Additionally, the MPU would fill the FIFO 2 soon after the PC has read the data from the receiver FIFO 2. The emulating circuit 30 provides the role of the delay circuitry 200a of FIG. 4 since the modem controller chip will not send the data from the FIFO to the PC until the delayed status bits are received by the PC.

FIG. 2 is a more detailed diagram showing the emulating logic for the receiver FIFO. The delay counter is implemented by increment/decrement logic 50 and increment arbiter circuit 52. A write signal on line 9 is sent to an increment arbiter circuit 52, which arbitrates between the increment caused by the write signals and the decrements caused by the character timer. If an increment caused by the write signals and a decrement caused by the character timer arrive simultaneously. The increment arbiter circuit 52 makes sure that the increment of the delay count caused by the write signal on line 9 is inhibited until after the decrement of the delay count caused by the character timer. This arbitration is necessary since the write signals are sent by the PC asynchronously. If the count-to-zero 60 implementing the delay counter is not decrementing the increment/decrement 50, then when a write signal is sent over line 9, the increment arbiter 52 sends a signal to the increment/decrement 50 over line 54 to increment the increment/decrement 50. The value of the delay count from the increment/decrement 50 is sent to the second ALU 42 over line 34. The values of a write pointer on line 56 and the read pointer on line 58 are sent to the first ALU 26. The first ALU 26 supplies the character count on lines 28 to the second ALU 42. The character timer is implemented by a count-to-zero 60, which is loaded with the register value on line 62. The count-to-zero 60 is decremented by the clock on line 64. The count-to-zero 60 produces a zero signal on line 66 which causes logic circuitry 74 send a signal to decrement the increment/decrement 50 over line 68. The logic circuitry 74 also causes a signal on line 70 to cause the count-to-zero 60 to load the register value on line 62 when the delay count in the increment/decrement 50 is zero, or when the count-to-zero 60 counts down to zero.

The receiver delay signal on the receiver delay line 72 enables and disables the use of the emulating circuitry. When this receiver delay signal is high, the trigger output GE1, GE4, GE8 and GE14 are set from the second ALU 42. When the receiver delay signal is set low, the status of the receiver FIFO buffer is not delayed and the trigger output GE1, GE4, GE8 and GE14 are set from the first ALU 26. In this manner the delay can be switched on or off.

FIG. 3 is a schematic showing the transmitter FIFO 80 and the emulating circuitry 102 for emulating the timing of transmitter UART FIFO. This figure shows the passing of data to transmitter FIFO 80 from the PC (not shown). The emulating circuitry 102 produces a delayed transmitter buffer empty signal that emulates the signal that would have been produced by a transmitter UART FIFO.

The transmitter FIFO 80 is a parallel input, parallel output FIFO buffer. Data from the transmitter FIFO 80 is read in parallel by the MPU over data lines 82. A read signal on line 84 from the MPU, and the read pointer from the read pointer circuitry 86 is sent to the read decode section 80a of the transmitter FIFO buffer 80 to determine what data is read by the MPU on line 82. The read pointer generating circuitry 86 is incremented by the read signals on line 90 from the MPU. The MPU is a part of the modem chip, in which this emulating circuitry 102 and transmitter FIFO buffer 80 are placed. A write signal from the PC on line 92 updates the write pointer 94. The PC data is written to the FIFO 80 from the PC over line 96 with a write signal sent to the write decode section 80b over line 100. The write decode section 80b of the transmitter FIFO buffer 80 uses the write pointer of the write pointer circuitry 94 and the write signal on line 100 and lines 96 to write data into the transmitter FIFO.

The read signal from the MPU is also sent to the emulating circuitry 102 on line 104. In this manner, the emulating circuitry 102 is connected to the MPU. The ALU unit 106 produces a character count on line 108 from the difference between the write pointer and the read pointer. The character count is used by the MPU to indicate the status of the transmitter FIFO buffer 80.

The delay counter 110 in the emulating circuitry 102 is incremented by the read signals from the MPU. The delay counter is decremented by the character timer 112. The character timer 112 acts as a count to zero. The character timer 112 is loaded with the contents of a register 114 and decremented on the clock pulses on line 116. The contents of the register 114 is chosen so that the character timer 112 counts down to zero in a predetermined amount of time. This predetermined amount of time is equal to the amount of time that a transmitter UART FIFO would take to read out data serially. The value in register 114 is chosen based upon the clock frequency. When a delay counter counts down to zero, a signal is sent to the AND gate 107. AND gate 197 sets the delayed transmitter buffer empty bit on line 120 if the transmit FIFO 80 is actually empty and the signal is sent from the delay counter. If the transmit buffer is actually empty, a signal is sent on line 109 from the ALU 106. When the write pointer is the same as the read pointer, the transmit FIFO 80 is empty.

Typically, the MPU reads the transmitter FIFO buffer in one burst of sixteen character reads. When all sixteen characters are read by the MPU, the delay count in the delay counter 110 is incremented to sixteen. The character timer then decrements the delay count in the delay counter until the delay count is zero. When the delay count is zero, a signal is sent on line 105 to the AND gate 107. As discussed above, if the transmit buffer is actually empty, a transmitter empty signal on line 109 is sent to the MPU and to AND gate 107. A delayed transmitter buffer signal on line 120 is sent to the PC when both the delay count is zero and the transmit buffer is actually empty. In this manner, the delayed transmitter buffer empty signal is sent at the time that a transmitter UART FIFO would have serially sent out all of its data.

Various details of the implementation and method are merely illustrative of the invention. It will be understood that various changes of details may be within the scope of the invention, which is to be limited only by the appended claims.

What is claimed is:

1. A circuit on a semiconductor chip for communicating to a PC that includes software designed to expect indications at time intervals being approximately the amount of time to fill a serial shift first-in first-out buffer, said circuit comprising:

a parallel input, parallel output first-in first-out buffer which receives data in parallel and sends data in parallel to the PC;

means connected to said parallel input, parallel output buffer for producing a first indication of the condition of the parallel input, parallel output buffer; and means connected to the producing means for emulating the status bits produced by a serial shift first-in first-out buffer, said emulating means sends a delayed indication of the status of the parallel input, parallel output buffer in a manner to emulate a serial shift first-in first-out buffer.

2. A circuit on a semiconductor chip for communicating to a PC that includes software designed to expect indications at time intervals being approximately the amount of time to fill a serial shift first-in first-out buffer, said circuit comprising:

a parallel input, parallel output first-in first-out buffer which receives data in parallel and sends data in parallel to the PC;

means connected to said parallel input, parallel output buffer for producing a first indication of the condition of the parallel input, parallel output buffer; and means connected to the producing means for emulating the status bits produced by a serial shift first-in first-out buffer, said emulating means sends a delayed indication of the status of the parallel input, parallel output buffer in a manner to emulate a serial shift first-in first-out buffer, wherein said parallel input, parallel output first-in first-out buffer is accessed with a write and read pointer and said first indication producing means comprises an arithmetic logic unit for producing a character count from the difference between said write and read pointers.

3. The circuit of claim 2, wherein said emulating means comprises means for producing a delay count and a second arithmetic logic unit connected to the delay count producing means for producing a delayed character count by subtracting the delay count from the character count.

4. The circuit of claim 3, wherein said delay count producing means comprises a counter incremented with a write signal when said parallel input, parallel output buffer is written to and a character timer that sends a signal to the counter to decrement the counter after a predetermined time similar to the period of time that a serial shift first-in first-out buffer would take to serially shift in a character.

5. The circuit of claim 4, wherein said timer is loaded with a value from a register and decremented by clock pulses.

6. A circuit on a semiconductor chip comprising:

a parallel input, parallel output first-in first-out buffer which receives data in parallel from a PC and sends data in parallel, said parallel buffer being accessed by a write pointer and a read pointer, said write pointer derived from a write signal sent by the PC and said read pointer being derived from read signals from a microprocessor unit; and means connected to receive said read signal from the PC for emulating a transmitter buffer empty signal of a serial shift first-in first-out buffer, the emulating means delaying the transmission of a transmitter buffer empty signal for a period of time which is approximately the period of time that a serial shift first-in first-out buffer would take to serially shift out a character.

7. A circuit on a semiconductor chip comprising:

a parallel input, parallel output first-in first-out buffer which receives data in parallel from a PC and sends data in parallel, said parallel buffer being accessed by a write pointer and a read pointer, said write pointer derived from a write signal sent by the PC and said read pointer being derived from read signals from a microprocessor unit; and means connected to receive said read signal from the PC for emulating a transmitter buffer empty signal of a serial shift first-in first-out buffer, the emulating means delaying the transmission of a transmitter buffer empty signal for a period of time which is approximately the period of time that a serial shift first-in first-out buffer would take to serially shift out a character, wherein said emulating means comprises a counter incremented with the read signal when said parallel input, parallel output buffer is read from and a character timer that sends a signal to the counter to decrement the counter after a period of time similar to the period of time that a serial shift first-in first-out buffer would take to serially shift out a character.

8. The circuit of claim 7, further comprising an arithmetic logic unit connected to receive the write pointer and the read pointer and adapted for producing a buffer empty signal, wherein said emulating means further comprises an AND gate for producing a delayed transmitter buffer empty signal, wherein said counter sends a signal to said AND gate when said counter counts down to zero and said arithmetic logic unit sends the buffer empty signal to the AND gate when the buffer is empty, the AND gate produces a delayed transmitter buffer empty signal.

9. A method of buffering data to be read by personal computer, comprising the steps of:

writing data into a parallel input, parallel output first-in first-out buffer in parallel at a first time; and emulating the timing of the updating of a status bit produced by a serial shift first-in first-out buffer if it were written into at said first time by producing a delayed status bit which is updated a predetermined amount of time after said first time, the delay being approximately the period of time a serial shift first-in first-out buffer would take if it were written into at said first time, wherein said timing emulating step includes the steps of:

incrementing a delay counter after said data writing step;

decrementing said delay counter after a predetermined amount of time;

producing a delayed character count from the output of the delay counter and from a character count that indicates the status of the parallel input, parallel output first-in first-out buffer; and producing from the delayed character count a delayed status bit.

10. A method of buffering data to be written from a personal computer, comprising the steps of:

reading data from a first-in first-out buffer in parallel to empty the buffer starting at a first time; and emulating the timing of the updating of a buffer empty bit produced by a serial shift first-in first-out buffer if it were read from at said first time by delaying production of a buffer empty bit for a period of time after the first time which is approximately the period of time a serial shift first-in first-out buffer would take to empty if it were read from at said first time, wherein said timing emulating step includes the steps of:

incrementing a delay counter by an amount equal to the characters read from the buffer;

decrementing said delay counter after a predetermined amount of time; and producing a delayed buffer empty bit when said delay counter counts down to zero and said buffer is empty.

11. A circuit comprising:

a first circuitry, comprising a personal computer, designed to be sent groups of data, said first circuitry designed to receive said groups of data with a certain time interval between groups; and a second circuitry, comprising a modem controller chip, connected to the first circuitry, said second circuitry designed to send data to said first circuitry, said second circuitry including a delay circuitry for delaying the sending of said groups of data so that said groups of data are sent with said certain time interval between groups, wherein said personal computer has software designed to expect an interrupt from the modem controller chip at said time intervals once said modem controller chip is sending groups of data, said time intervals being approximately the amount of time to fill a serial shift first-in first-out buffer, wherein said modem controller chip includes a parallel input, parallel output first-in first-out buffer receiving data in parallel from said personal computer wherein said delay circuitry comprises circuitry for sending personal computer delayed status bits so as to emulate the timing of a serial shift first-in first-out buffer.

12. The circuit of claim 11 wherein said first circuitry comprises a slave processor and wherein said second circuitry comprises a master processor.

13. The circuit of claim 11 wherein said first circuitry comprises a master processor and wherein said second circuitry comprises a slave processor.

14. The circuit of claim 11 wherein said first circuitry comprises a first co-processor and wherein said second circuitry comprises a second co-processor.

15. The circuit of claim 14 wherein said first circuitry further comprises circuitry to pass data to said second circuitry and said second circuitry further comprises a buffer connected to be passed data from said first circuitry, circuitry for producing a notification that the buffer is available to be sent data and a second delay circuitry for delaying the sending of the notification to the first circuitry that the buffer is available to be sent data.

* * * * *

UNITED STATES PATENT AND TRADEMARK OFFICE
CERTIFICATE OF CORRECTION

PATENT NO. : 5,619,681
DATED : April 8, 1997
INVENTOR(S) : Benhamida et al.

It is certified that error appears in the above-indentified patent and that said Letters Patent is hereby corrected as shown below:

In Column 10, line 58, Claim 9:
  replace "A method of buffering data to be read by personal" with:

--A method of buffering data to be read by a personal--

In Column 11, line 20, Claim 10:
  replace "were read from at said first time by delaying production" with:

--were read from at said first time by delaying the production--

In Column 12, line 15, Claim 11:
  replace "delay circuitry comprises circuitry for sending personal" with:

--delay circuitry comprises circuitry for sending to said personal--

Signed and Sealed this

Twenty-seventh Day of January, 1998

Attest:

BRUCE LEHMAN

Attesting Officer

Commissioner of Patents and Trademarks